(12) United States Patent
Toth et al.

(10) Patent No.: US 11,417,934 B2
(45) Date of Patent: Aug. 16, 2022

(54) CONNECTION ELEMENT FOR MECHANICAL AND ELECTRICAL CONNECTION TO A CONTACT ELEMENT OF AN ELECTRICAL STORAGE CELL

(71) Applicant: TE Connectivity Germany GmbH, Bensheim (DE)

(72) Inventors: Gerzson Toth, Mannheim (DE); Andreas Baus, Bensheim (DE); Wilhelm Grzywok, Munich (DE); Uwe Hauck, Kleinmanchow (DE); Andre Martin Dressel, Lampertheim (DE); Yoshikawa Hiroko, Kanagawa (JP)

(73) Assignee: TE Connectivity Germany GmbH, Bensheim (DE)

(*) Notice: Subject to any disclaimer, the term of this patent is extended or adjusted under 35 U.S.C. 154(b) by 384 days.

(21) Appl. No.: 16/193,417

(22) Filed: Nov. 16, 2018

(65) Prior Publication Data
US 2019/0148703 A1 May 16, 2019

(30) Foreign Application Priority Data

Nov. 16, 2017 (DE) .......................... 102017220505.9

(51) Int. Cl.
*H01M 50/502* (2021.01)
*H01R 4/28* (2006.01)
*H01R 4/01* (2006.01)

(52) U.S. Cl.
CPC ............ *H01M 50/502* (2021.01); *H01R 4/28* (2013.01); *H01R 4/01* (2013.01)

(58) Field of Classification Search
CPC ........... H01M 2/20–206; H01M 2/202; H01M 50/50–502; H01R 4/01; H01R 4/28
See application file for complete search history.

(56) References Cited

U.S. PATENT DOCUMENTS

| | | | | |
|---|---|---|---|---|
| 4,969,835 A | * | 11/1990 | Kobayashi | H01R 4/01 24/563 |
| 5,105,178 A | * | 4/1992 | Krumme | H01R 4/01 337/140 |
| 2007/0071575 A1 | * | 3/2007 | Rudduck | F16B 21/06 411/386 |
| 2012/0058371 A1 | | 3/2012 | Carignan | |
| 2012/0156544 A1 | | 6/2012 | Schaefer et al. | |

(Continued)

FOREIGN PATENT DOCUMENTS

| | | |
|---|---|---|
| CN | 102326297 A | 1/2012 |
| CN | 106068571 A | 11/2016 |

OTHER PUBLICATIONS

Chinese Office Action and English Translation, Application No. 2022041600712710, dated Apr. 20, 2022, 17 pages.

*Primary Examiner* — Cynthia H Kelly
*Assistant Examiner* — Niara Trant
(74) *Attorney, Agent, or Firm* — Barley Snyder

(57) ABSTRACT

A connection element for mechanical and electrical connection to a contact element of an electrical storage cell comprises a contact receptacle and a clamping device. The contact receptacle is open in a set-on direction and receives a portion of the contact element. The clamping device extends into the contact receptacle in a press-on position of the clamping device. The clamping device is formed from a shape memory alloy transferable by a phase transformation into the press-on position.

18 Claims, 3 Drawing Sheets

(56) References Cited

U.S. PATENT DOCUMENTS

| | | |
|---|---|---|
| 2012/0293016 A1 | 11/2012 | Schaefer et al. |
| 2015/0037642 A1 | 2/2015 | Pinon et al. |
| 2016/0149256 A1* | 5/2016 | Leroux ............ H01M 10/0468 |
| | | 429/153 |

* cited by examiner

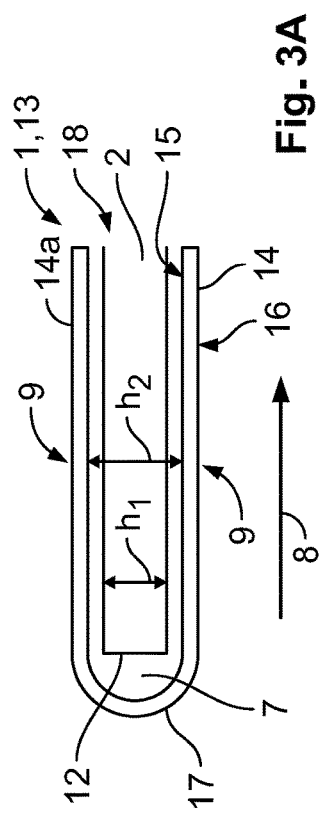
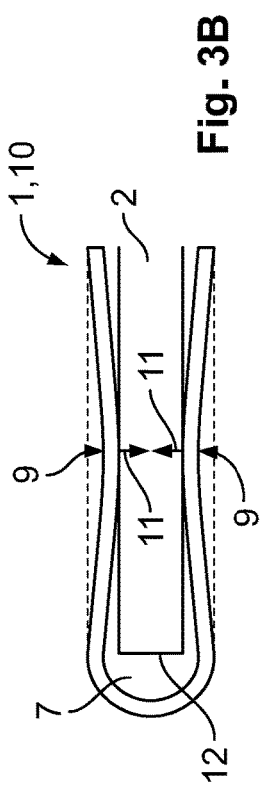
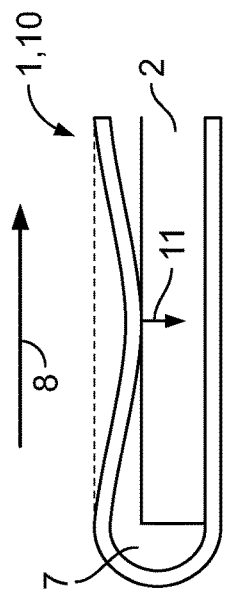
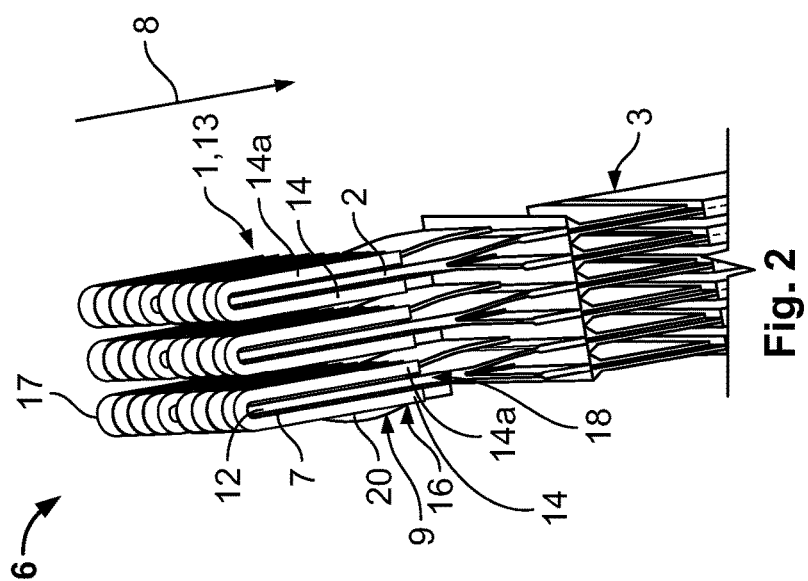
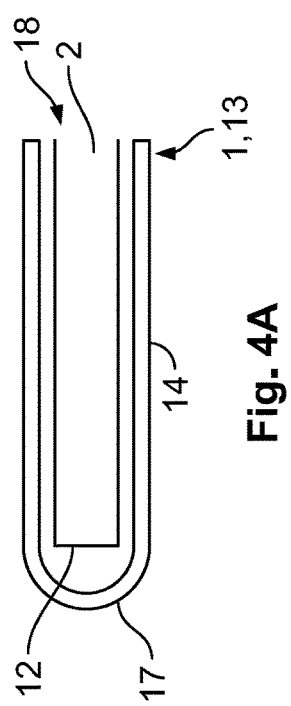

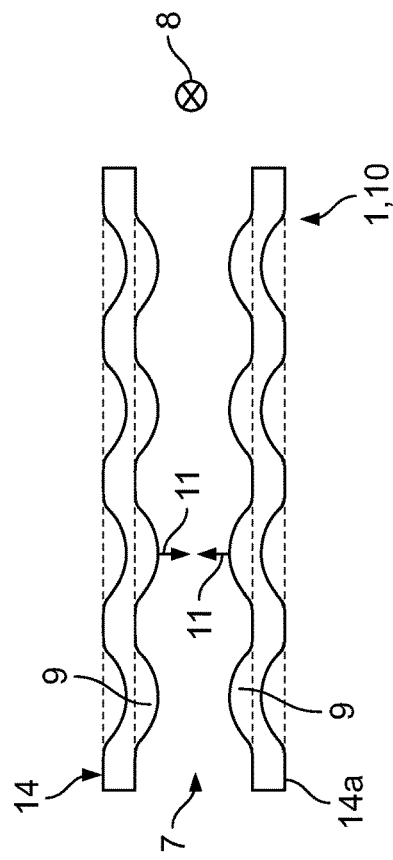
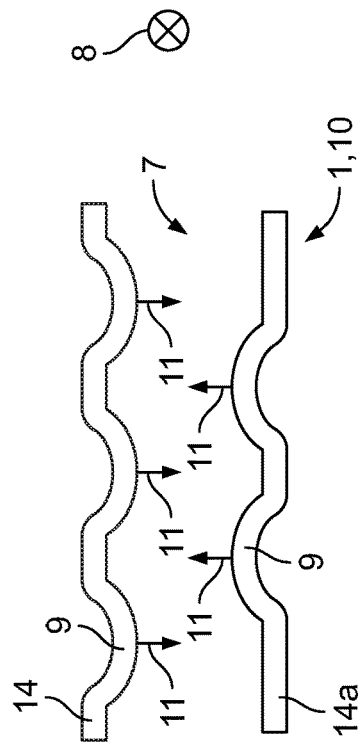
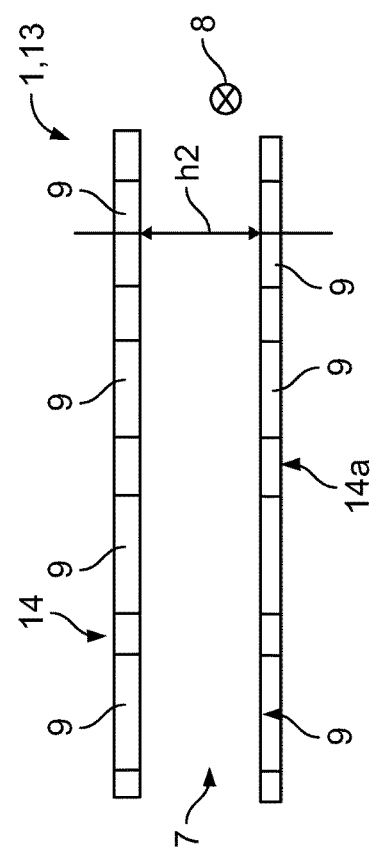
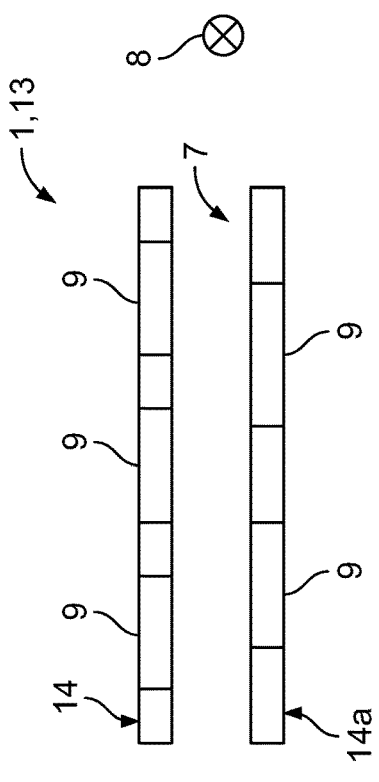

CONNECTION ELEMENT FOR MECHANICAL AND ELECTRICAL CONNECTION TO A CONTACT ELEMENT OF AN ELECTRICAL STORAGE CELL

CROSS-REFERENCE TO RELATED APPLICATION

This application claims the benefit of the filing date under 35 U.S.C. § 119(a)-(d) of German Patent Application No. 102017220505.9, filed on Nov. 16, 2017.

FIELD OF THE INVENTION

The present invention relates to a connection element and, more particularly, to a connection element for mechanical and electrical connection to a contact element of an electrical storage cell.

BACKGROUND

Batteries, also referred to herein as primary stores, and accumulators, also referred to herein as secondary stores, are known for storing electrical energy. The primary and secondary stores are composed of one or more electrical storage cells in which chemical energy is transformed into electrical energy in an electrochemical discharge reaction when an electrical load is applied. Primary stores are generally charged only once and have to be disposed of after discharge, while secondary stores allow several cycles of discharge by applying a load current and discharging. Recently, primary and secondary stores have incorporated lithium compounds. Lithium compounds have a high energy density and thermal stability, deliver a constant voltage in the case of low self-discharge, and are free of the so-called memory effect.

Pouch cells, owing to their high energy density, have been the focus of intensive research efforts in the automobile industry to find a suitable technological platform for traction batteries in electrical or hybrid drive systems. Pouch cells typically consist of a plurality of galvanic elements connected in parallel, the electrodes of which are formed of foils and separated by separators. This arrangement is located within a casing, which also accommodates an electrolyte, and thus forms a base unit. The base unit is typically closed off to the outside in such a way that one or more casing elements, likewise consisting of a foil, are connected to each other by a joining process to form the casing, wherein flexible contact tabs are led out of the casing towards the outside as contact elements.

Pouch cells are stacked in a frame, and their contact tabs are connected together either in series or in parallel to achieve high voltage and/or high capacitances. Different housings with fastening frames, however, are produced for each specific application. This causes significant construction and production outlay. Moreover, the electrical and mechanical contacting of the flexible, non-dimensionally stable contact tabs is virtually impossible using the conventional connection techniques such as welding or screwing. In addition, the frame reduces the density with which the individual storage cells can be stacked.

SUMMARY

A connection element for mechanical and electrical connection to a contact element of an electrical storage cell comprises a contact receptacle and a clamping device. The contact receptacle is open in a set-on direction and receives a portion of the contact element. The clamping device extends into the contact receptacle in a press-on position of the clamping device. The clamping device is formed from a shape memory alloy transferable by a phase transformation into the press-on position.

BRIEF DESCRIPTION OF THE DRAWINGS

The invention will now be described by way of example with reference to the accompanying Figures, of which:

FIG. 2 is a sectional perspective view of the connection element, taken along line A-A of FIG. 1;

FIG. 3A is a sectional side view of a connection element according to another embodiment in a set-on position;

FIG. 3B is a sectional side view of the connection element of FIG. 3A in a press-on position;

FIG. 4A is a sectional side view of a connection element according to another embodiment in a set-on position;

FIG. 4B is a sectional side view of the connection element of FIG. 4A in a press-on position;

FIG. 5A is a sectional side view of a connection element according to another embodiment in a set-on position;

FIG. 5B is a sectional side view of the connection element of FIG. 5A in a press-on position;

FIG. 6A is a sectional side view of a connection element according to another embodiment in a set-on position; and FIG. 6B is a sectional side view of the connection element of FIG. 6A in a press-on position.

DETAILED DESCRIPTION OF THE EMBODIMENT(S)

Figure 1:
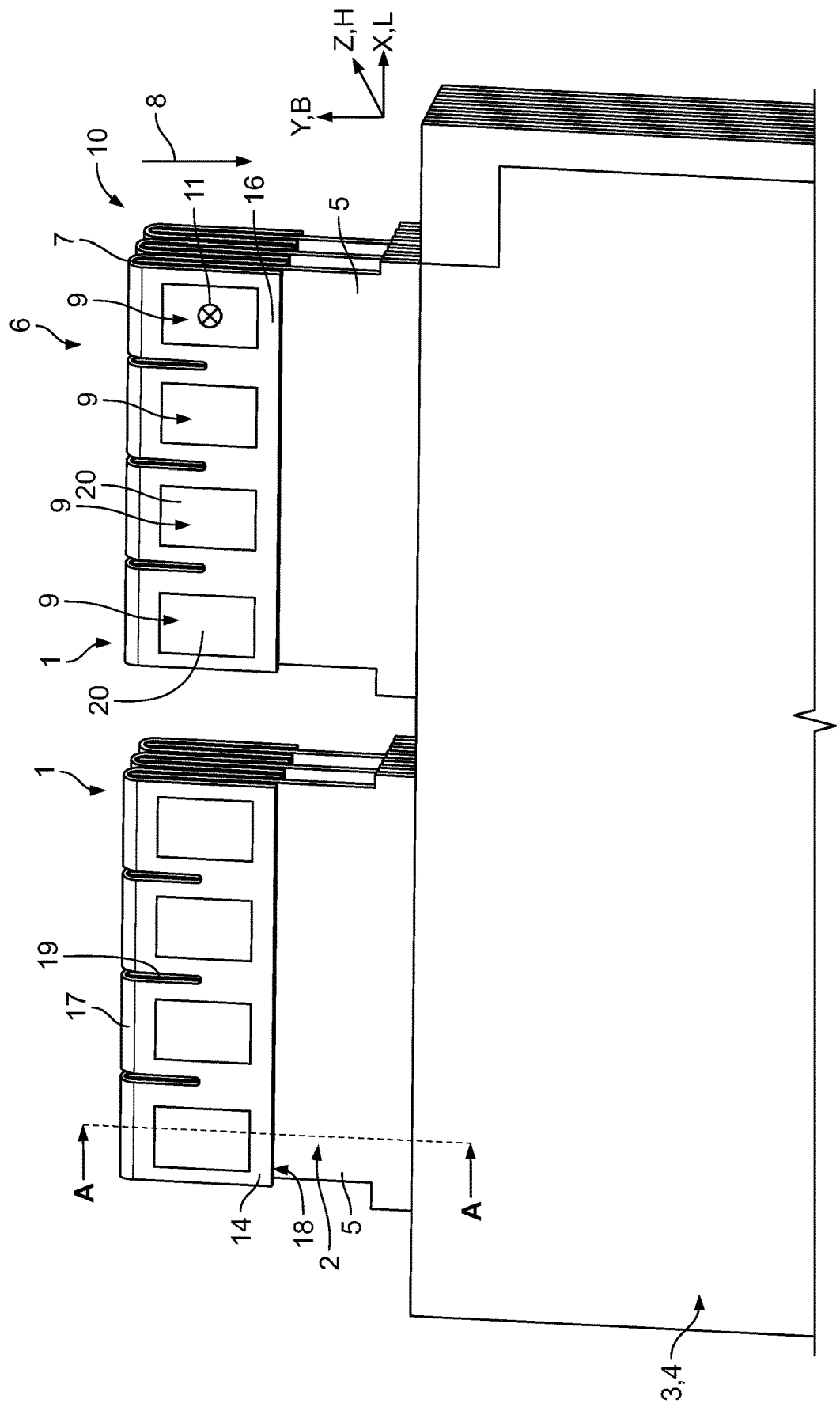
FIG. 1 is a perspective view of a connection element according to an embodiment set onto a contact element of an electrical storage cell.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A connection element 1 for mechanical and electrical connection to a contact element 2 of an electrical storage cell 3 according to an embodiment is shown in FIGS. 1 and 2. In the embodiment shown, the electrical storage cell 3 is a pouch cell 4, the contact element 2 of which is designed as a flexible contact tab 5. FIGS. 1 and 2 schematically depict an electrical storage cell module 6, which includes a plurality of electrical storage cells 3, three in the example shown.

As shown in FIGS. 1 and 2, the connection element 1 has a receptacle 7. The receptacle 7 is open in a set-on direction 8 and is configured to receive at least part of the contact element 2. An xyz coordinate system is shown in FIG. 1. The x-axis here corresponds to the longitudinal direction L of the connection element 1. The y-axis corresponds to the width B or depth of the connection element 1. The set-on direction 8 runs parallel to the width B and is oriented in relation to the coordinate system counter to the direction of the y-axis in FIG. 1. Finally, the z-axis corresponds to the height H of the connection element 1, or its receptacle 7.

The connection element 1, as shown in FIGS. 1 and 2, comprises at least one clamping device 9, there being four clamping devices 9 in the embodiment of FIGS. 1 and 2 which are shown by way of example. The clamping device 9 extends in a press-on position 10 into the contact receptacle 7. In the press-on position 10, the clamping device 9 exerts a press-on force 11, which is directed into the contact receptacle 7. The clamping device 9 exerts the press-on force 11 onto the contact element 2, which is placed in the contact receptacle 7, such that the connection element 1 is connected mechanically and electrically to the contact element 2 of the storage cell 3.

In the exemplary storage cell module 6 shown in FIG. 1, one connection element 1 is set on each of the two contact tabs 5 of each of the three pouch cells 4, such that part of the contact tab 5 of the pouch cell 4 is received in the contact receptacle 7 of the connection element 1 and connected mechanically and electrically to the contact tab 5 in the press-on position 10. By way of the corresponding arrangement of the various pouch cells 4 in relation to each other, the pouch cells 4 can be connected simply both in series and in parallel to each other, in order to form a desired storage cell module 6. The stack of storage cells 3 is built up in the z direction and two rows of contact tabs 5 are formed with connection elements 1 connected electrically and mechanically thereto.

The clamping device 9 of the connection element 1 is formed from a shape memory alloy, which is transferable into the press-on position 10 by a phase transformation. In order to connect it mechanically and electrically to the contact element 2 of the storage cell 3, the at least one clamping device 9 can be designed to be transferable from a set-on position 13, in which it is arranged outside the contact receptacle 7, by the phase transformation into the press-on position 10 in which it extends into the contact receptacle 7. In FIG. 2, the connection element 1 according to the invention from the first embodiment is shown in its set-on position 13, wherein the clamping device 9 in this case is curved outwards by way of example, away from the contact receptacle 7.

In the set-on position 13, the connection element 1 can be pushed in a powerless manner in the set-on direction 8 onto a distal end 12 of the contact element 2, shown in FIG. 2, because the thickness or height h1 of the contact element 2 is smaller than the internal width or height h2 of the contact receptacle 7, as shown in FIGS. 3A and 3B. After setting-on of the connection element 1, such that at least part of the contact element 2 is received in the contact receptacle 7, the clamping device 9 is transferred from its set-on position 13 into its press-on position 10, for example by being slightly warmed by applying a current, and is thereby transferred into its high-temperature phase.

In the embodiment shown in FIGS. 1 and 2, the clamping device 9 has a pressure plate 20, which, in the press-on position 10, is curved inwards into the contact receptacle 7. In the exemplary embodiment of FIGS. 1 and 2, the pressure plate 20, in the set-on position 13, is curved outwards out of the outer surface of the clamping jaw 14.

The shape memory alloy, from which the clamping device 9 is formed, can by way of example be selected from the group consisting of nickel-titanium, nitinol, nickel-titanium copper, copper-zinc, copper-zinc-aluminum and copper-zinc-nickel, depending on the material from which the contact element 2 is made or which electrical and mechanical properties are desired. Shape memory alloys are metals that can exist in two different crystal structures or phases. They are also called memory metals, as they can re-form to an earlier shaping despite subsequent deformation. The shape change is based on the temperature-dependent lattice conversion to one of two crystal structures.

As shown in FIGS. 1-3A, the contact receptacle 7 is arranged by way of example between two clamping jaws 14, 14a of the connection element 1. The clamping jaws 14, 14a have a bearing surface 15, which faces into the contact receptacle 7, and also an outer surface 16 that lies opposite this bearing surface 15 and faces outwards away from the contact receptacle 7. Both clamping jaws 14, 14a are configured as clamping plates and are arranged substantially parallel to each other. The clamping jaws 14, 14a can be connected to each other by a yoke 17. The yoke 17 runs substantially perpendicular to the set-on direction 8, in the longitudinal direction L, and is opposite the insertion aperture 18 through which the distal end 12 of the contact element 2 is inserted into the contact receptacle 7. As shown in FIG. 2, the connection element 1 can thus have a U-shaped cross-section and be constructed in the manner of a clasp or clamp, in which the two clamping jaws 14, 14a are connected via the yoke 17 and can be deflected elastically in the height direction H.

The clamping device 9 is arranged at one of the clamping jaws 14, 14a, and is arranged at the clamping jaw 14 in the embodiment of FIGS. 1 and 2. The clamping device 9 formed from a shape memory alloy can be constructed monolithically with the clamping jaw 14; in this case, the clamping jaw 14 is composed of a shape memory alloy. It is also possible to insert an inlay of a shape memory alloy in recesses (not shown) of the clamping jaw 14, in order to save material of the shape memory alloy and/or to have the possibility to use a different material than a shape memory alloy for the clamping jaws 14, 14a, so as to fulfill certain requirements (hardness, elasticity, resistance to certain substances, etc.).

At least two clamping devices 9 can be arranged at a clamping jaw 14, 14a, and in the exemplary embodiment of FIGS. 1 and 2, a total of four clamping devices 9 are arranged at the clamping jaw 14. The four clamping devices 9 are arranged next to each other transverse to the insertion direction 8, namely in the longitudinal direction L. The clamping devices 9 can be distributed uniformly over the entire clamping jaw 14, in order to generate as uniform a press-on force 11 as possible.

If the clamping device or devices 9 are arranged at one of the clamping jaws 14 and the other clamping jaw 14a lying opposite the clamping jaw 14 has no clamping devices, as in the embodiment of FIGS. 1 and 2, the opposing force counteracting the press-on force 11 is exerted by the opposite clamping jaw 14a. In the shown embodiment, the opposing force is enhanced owing to the clamp- or clasp-shaped configuration and the spring design associated therewith.

If particularly high pressure forces are required for the mechanical and electrical connection, the connection element 1 can be provided additionally with a clinch, crimp or weld section with which the connection element 1 is configured in such a way that it can be connected in a form-fitting and/or adhesive manner to the contact element 2, in addition to the press-on force 11. The sections for clinching, crimping, or welding can be arranged at the edge regions of the clamping jaws 14, 14a, which point in and, respectively, counter to the longitudinal direction L.

As shown in FIGS. 1 and 2, a slot 19 can be formed in the clamping jaw 14 of the connection element 1. The slot 19 can, by way of example, extend in the insertion direction 8. In the embodiment of FIGS. 1 and 2, one slot 19 is arranged between each two adjacent clamping devices 9 of the clamping jaw 14. In this way, a more uniform distribution of the press-on forces 11 of the clamping devices 9 is achieved, because the slot 19 affords the clamping jaw 14 flexibility in its plane which is spanned by the length L and width B.

In the embodiment shown in FIG. 1, the slot 19 extends from the yoke 17 in the direction of the insertion aperture 18. The slot 19 penetrates the yoke 17 and each of the pair of clamping jaws 14, 14a. The slot 19 thus gives the clamping jaw 14 a comb-like design, which affords the clamping jaw 14 a certain flexibility even in the otherwise somewhat rigid area at the yoke 17. Alternatively, a meandering design would also be possible, in which by way of example the middle slot 19, going out from the insertion aperture 18, runs in the direction of the yoke 17 in the insertion direction 8. The flexibility of the connection element 1 in the plane formed by the longitudinal L and width B direction can further be enhanced in that the slot 19 penetrates both the yoke 17 and also both clamping jaws 14, 14a.

The connection element 1 allows an effective and space-saving mechanical and electrical connection of contact elements 2 of a storage cell 3, for example, the contact tabs 5 of a pouch cell 4. As a result, the storage cells 3 can be packed very tightly to form the storage cell module 6 with high energy density.

The phase transformation and the transfer of the clamping device 9 from its set-on position 13 into its press-on position 10 will be discussed in greater detail hereinafter with reference in particular to FIGS. 3A to 6B.

A connection element 1 according to another embodiment is shown in FIGS. 3A and 3B. The connection element 1 is shown in the set-on position 13 in FIG. 3A, with the clamping devices 9 arranged in the plane of the clamping jaws 14 and 14a. The connection element 1 is shown in the press-on position 10 in FIG. 3B, in which the clamping devices 9 extend into the contact receptacle 7 after a phase transformation of the shape memory alloy has taken place.

In the embodiment of FIGS. 3A and 3B, one clamping device 9 is arranged at each of the clamping jaws 14, 14a. The two clamping jaws 9 thus exert a press-on force 11 actively onto the contact element 2 in the contact receptacle 7 from both sides.

In order to give the shape memory alloy the desired spatial configuration of the clamping devices 9 both in the set-on position 13 and in the press-on position 10, the clamping device 9 can first be embossed under temperature and pressure in the press-on position 10, in which the clamping device 9 extends into the contact receptacle 7. This configuration corresponds to the high-temperature phase. Subsequently, the clamping device 9 is deformed when cold in such a way that it is shaped out of the contact receptacle 7, in the embodiment of FIGS. 3A and 3B by way of example such that it is formed into the plane of the clamping jaws 14, 14a. This configuration corresponds to the cold-temperature phase (martensite). In order to achieve a return of the clamping device 9 from the cold-temperature phase into the high-temperature phase (austenite), the clamping device 9 can be slightly warmed under current, as a result of which internal stresses in the shape memory alloy are reduced and the phase conversion is effected.

A connection element 1 according to another embodiment is shown in FIGS. 4A and 4B. In the embodiment of FIGS. 4A and 4B, the clamping device 9 is arranged in its set-on position 13 in the plane of the clamping jaw 14 and is not curved outwards as in the case of the embodiment from FIGS. 1 and 2.

In FIGS. 3B and 4B, the space of the contact receptacle 7 formed by the clamping jaws 14, 14a in the cold-temperature phase, as in FIGS. 3A and 4A, is depicted partially by a dashed line, which shows that the clamping device 9, in the press-on position 10, extends into the contact receptacle 7. In the shown embodiments, the clamping device 9 is curved inwards into the contact receptacle 7.

Other embodiments of a connection element 1 are shown in FIGS. 5A-6B. In FIGS. 5A-6B, the connection elements 1 are shown in longitudinal section, that is to say shown cut in the longitudinal direction L. In addition the contact element 2 has been omitted in FIGS. 5A-6B. In the embodiments of FIGS. 5A-6B, each of the clamping jaws 14 is provided with a plurality of clamping devices 9, such that a press-on force 11 is directed into the contact receptacle 7 actively on both sides when the connection element 1 is in its press-on position 10.

In the embodiment of FIGS. 5A and 5B, the clamping devices 9 are arranged in a symmetrically mutually aligned manner at clamping jaws 14, 14a which face each other. As a result, the press-on forces 11 of opposite clamping devices 9 are counteracted substantially in such a way that they meet at a common point.

In contrast to this, in the exemplary embodiment of FIGS. 6A and 6B, the clamping devices 9 are arranged in a symmetrically mutually offset manner at clamping jaws 14, 14a which face each other, as a result of which a more uniform distribution of the press-on forces 11 can be achieved at the contact receptacle 7.

In the connection element 1 according to the embodiments of the invention, the clamping device 9 is in the press-on position 10 in the high-temperature phase and relaxes in the direction of the high-temperature phase under elevated temperature. The clamping device 9 consequently relaxes under flow of current such as when charging or discharging the storage cell 3 and is thus moved out into the press-on position 10. The clamping device 9 is self-resetting and wear-resistant, and thus can be used reliably over long periods of time, even in harsh conditions like those which occur in motor vehicles.

What is claimed is:

1. A connection element for mechanical and electrical connection to a contact element of an electrical storage cell, comprising:
   a contact receptacle open in a set-on direction and receiving a portion of the contact element;
   a pair of clamping jaws defining the contact receptacle; and
   a clamping device arranged on at least one of the pair of clamping jaws, the clamping device extends into the contact receptacle in a press-on position of the clamping device, the clamping device is formed from a shape memory alloy transferable by a phase transformation into the press-on position, at least a portion of one of the pair of clamping jaws is not formed from the shape memory alloy.

2. The connection element of claim 1, wherein the contact element is a contact tab and the electrical storage cell is a pouch cell.

3. The connection element of claim 1, wherein the clamping device is transferable by the phase transformation from a set-on position into the press-on position, the clamping device is arranged outside of the contact receptacle in the set-on position.

4. The connection element of claim 1, wherein the clamping device is arranged in a plane of one of the clamping jaws in the set-on position.

5. The connection element of claim 1, further comprising a pair of clamping devices, each of the clamping devices is arranged at one of the pair of clamping jaws.

6. The connection element of claim 5, wherein the pair of clamping devices face each other and are arranged in a symmetrically mutually aligned manner.

7. The connection element of claim 5, wherein the pair of clamping devices face each other and are arranged in an asymmetrically mutually offset manner.

8. The connection element of claim 1, wherein a slot is formed in at least one of the pair of clamping jaws.

9. The connection element of claim 8, wherein a pair of clamping devices are arranged at one of the pair of clamping jaws and the slot extends between the pair of clamping devices.

10. The connection element of claim 8, wherein the slot extends in the set-on direction from a yoke that connects the pair of clamping jaws.

11. The connection element of claim 10, wherein the slot penetrates the yoke and each of the pair of clamping jaws.

12. The connection element of claim 1, wherein the clamping device has a pressure plate curved inward into the contact receptacle in the press-on position.

13. The connection element of claim 1, wherein the shape memory alloy is selected from the group consisting of nickel-titanium, nitinol, nickel-titanium copper, copper-zinc, copper-zinc-aluminum, and copper-zinc-nickel.

14. An electrical storage cell module, comprising:
a plurality of electrical storage cells each having a contact element; and
a connection element including:
a contact receptacle open in a set-on direction and receiving a portion of the contact element;
a pair of clamping jaws defining the contact receptacle; and
a clamping device arranged on at least one of the pair of clamping jaws, the clamping device extends into the contact receptacle and is mechanically and electrically connected to the contact element in a press-on position of the clamping device, the clamping device is formed from a shape memory alloy transferable by a phase transformation into the press-on position, at least a portion of one of the pair of clamping jaws is not formed from the shape memory alloy.

15. A connection element for mechanical and electrical connection to a contact element of an electrical storage cell, comprising:
a contact receptacle open in a set-on direction and receiving a portion of the contact element;
a pair of clamping jaws, the contact receptacle is disposed between the pair of clamping jaws; and
a pair of clamping devices arranged on one of the clamping jaws, a slot extends through the one of the clamping jaws between the pair of clamping devices, the clamping devices extend into the contact receptacle in a press-on position of the clamping devices, the clamping devices are formed from a shape memory alloy transferable by a phase transformation into the press-on position.

16. The connection element of claim 15, wherein the slot extends in the set-on direction from a yoke that connects the pair of clamping jaws.

17. The connection element of claim 16, wherein the slot penetrates the yoke and each of the pair of clamping jaws.

18. The connection element of claim 3, wherein the clamping jaws remain stationary while the clamping device moves between the set-on position and the press-on position.

* * * * *